Dec. 7, 1965   H. P. HALSEY   3,221,400
MOTOR MAINTENANCE RACK
Filed Jan. 24, 1963   3 Sheets-Sheet 1

INVENTOR.
HOMER P. HALSEY
BY
Meyer, Baldwin, Doran & Egan
ATTORNEYS

Dec. 7, 1965   H. P. HALSEY   3,221,400
MOTOR MAINTENANCE RACK
Filed Jan. 24, 1963   3 Sheets-Sheet 2
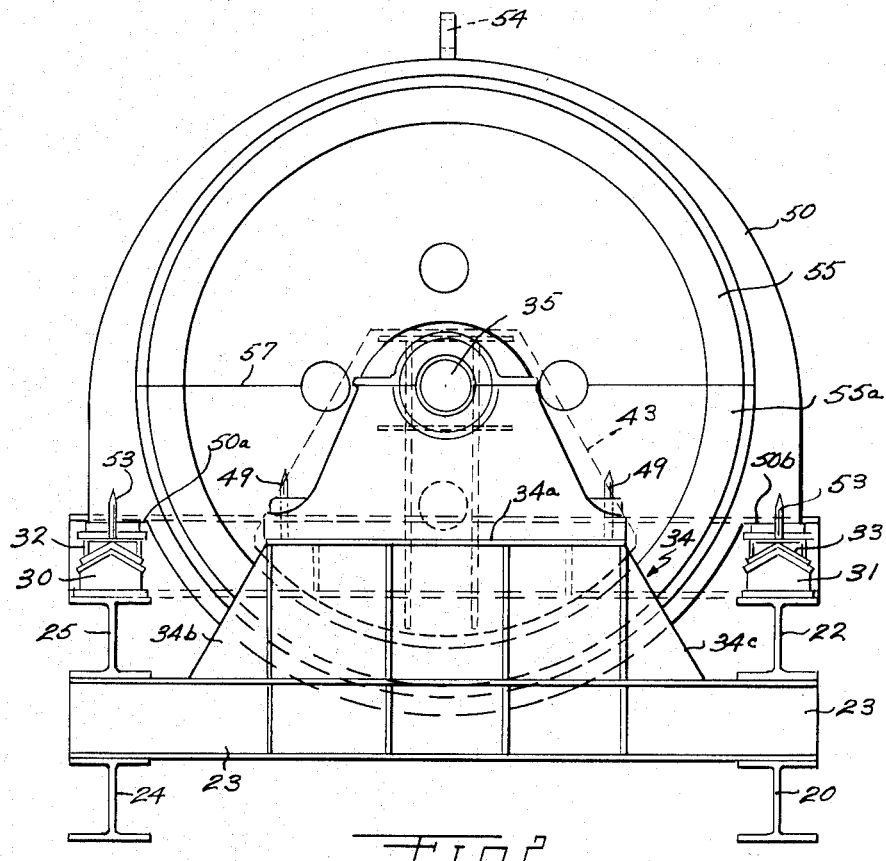
Fig. 2
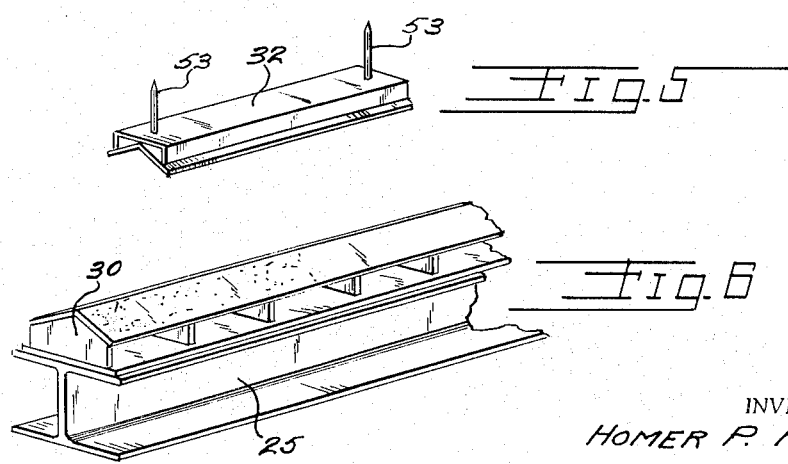
Fig. 5
Fig. 6
INVENTOR.
HOMER P. HALSEY
BY
Meyer, Baldwin, Doran & Egan
ATTORNEYS Dec. 7, 1965    H. P. HALSEY    3,221,400
MOTOR MAINTENANCE RACK
Filed Jan. 24, 1963    3 Sheets-Sheet 3

INVENTOR.
HOMER P. HALSEY
BY
Meyer, Baldwin, Doran & Egan
ATTORNEYS

United States Patent Office 3,221,400
Patented Dec. 7, 1965

3,221,400
MOTOR MAINTENANCE RACK
Homer P. Halsey, Silver Bay, Minn., assignor to Reserve Mining Company, Silver Bay, Minn., a corporation of Minnesota
Filed Jan. 24, 1963, Ser. No. 253,580
4 Claims. (Cl. 29—205)

This invention relates to a novel and improved motor maintenance rack for large electric motors and more particularly to a means for readily, rapidly and economically separating the rotor of a motor from the stator a sufficient amount for the inspection, cleaning and repair of the rotor or stator wirings.

In accordance with present practice, either an overhead crane is used to separate the rotor from the stator, or a so-called "stator-shift" assembly is designed as an integral part of the motor. Both methods pose respective problems.

The main object is to the use of the crane method for disassembling and re-assembling a large motor is the excessive amount of time required, both crane time and man-hours. Not only is this procedure slow and costly, but it also requires the utmost care to avoid damage to the windings of the stator and the rotor. Before disassembly can begin, a heavy beam must be secured axially through the rotor to provide means near each end of the beam for attaching the respective crane cables. Since the lateral movement of the rotor is restricted by the length of the beam and the crane cables, several successive hitch operations are generally required to separate the units sufficiently to provide proper working areas around the units. Any drift or swing of the rotor as it is being removed endwise from the stator will probably cause damage to the windings. Therefore for each hitch extensive blocking and positioning procedures must be employed to keep the rotor in proper alignment.

The primary purpose of a stator-shift assembly on a motor is to provide a convenient means whereby the motor can be inspected or repaired in place. A stator shift is accomplished by built-in means on the motor housing and supports, permitting relative movement between the stator and the rotor. However, should the motor require extensive repairs, this in-place position requires a shutdown of the apparatus driven by the motor during the time required for the repair work, with a resulting loss of production time. Then too, although the stator is separated somewhat from the rotor, it still surrounds the rotor shaft which reduces the accessibility to the stator coils and also restricts the removal or replacement of either the stator or rotor unless recourse is had to a crane technique similar to that described above. In addition motors equipped with stator-shifts are much more expensive and more bulky than standard motors.

In view of the foregoing objections and difficulties, an object of the present invention is to provide novel and improved means which I term a "motor maintenance rack" which is situated at a convenient working location, and to which the motor may be readily and quickly transferred when maintenance work is needed.

A further object of the invention is to provide a rack of the character just indicated which greatly reduces the crane work and man hours required to service the motor and return it to operation.

A further object of the invention is to provide a rack as defined in the last two preceding paragraphs which expedites motor repair work and renders it less expensive.

A further object of the invention is to prevent accidental damage to the structure and windings of the rotor and stator during dis-assembly and repair.

A further object of the invention is to provide a rack of the character above described which can be cheaply constructed, and which permits installation of a plurality of standard synchronous motors in a smaller floor space, since all can be serviced at a single rack. The prior art stator-shift type motors required an undesirable amount of floor space for positioning a plurality of motors.

A further object of the invention is to provide means permitting sufficient separation of the stator and rotor of a motor to permit ready accessibility to the separated units.

Other objects and advantages will be apparent from a study of the following description of the invention in conjunction with the accompanying drawings showing one embodiment thereof, and in which FIG. 1 is a side elevational view of a motor maintenance rack, a motor assembly being shown thereon in dot-dash fashion, in both assembled and dis-assembled position.

FIG. 2 is an end elevational view as seen from the line 2—2 at the left end of FIG. 1.

FIG. 5 is a perspective view of a movable V-block member the use of which will later be described, and FIG. 6 is a perspective view of a fragmentary portion of a runway on which the said V-block is movable.

Figure 1:
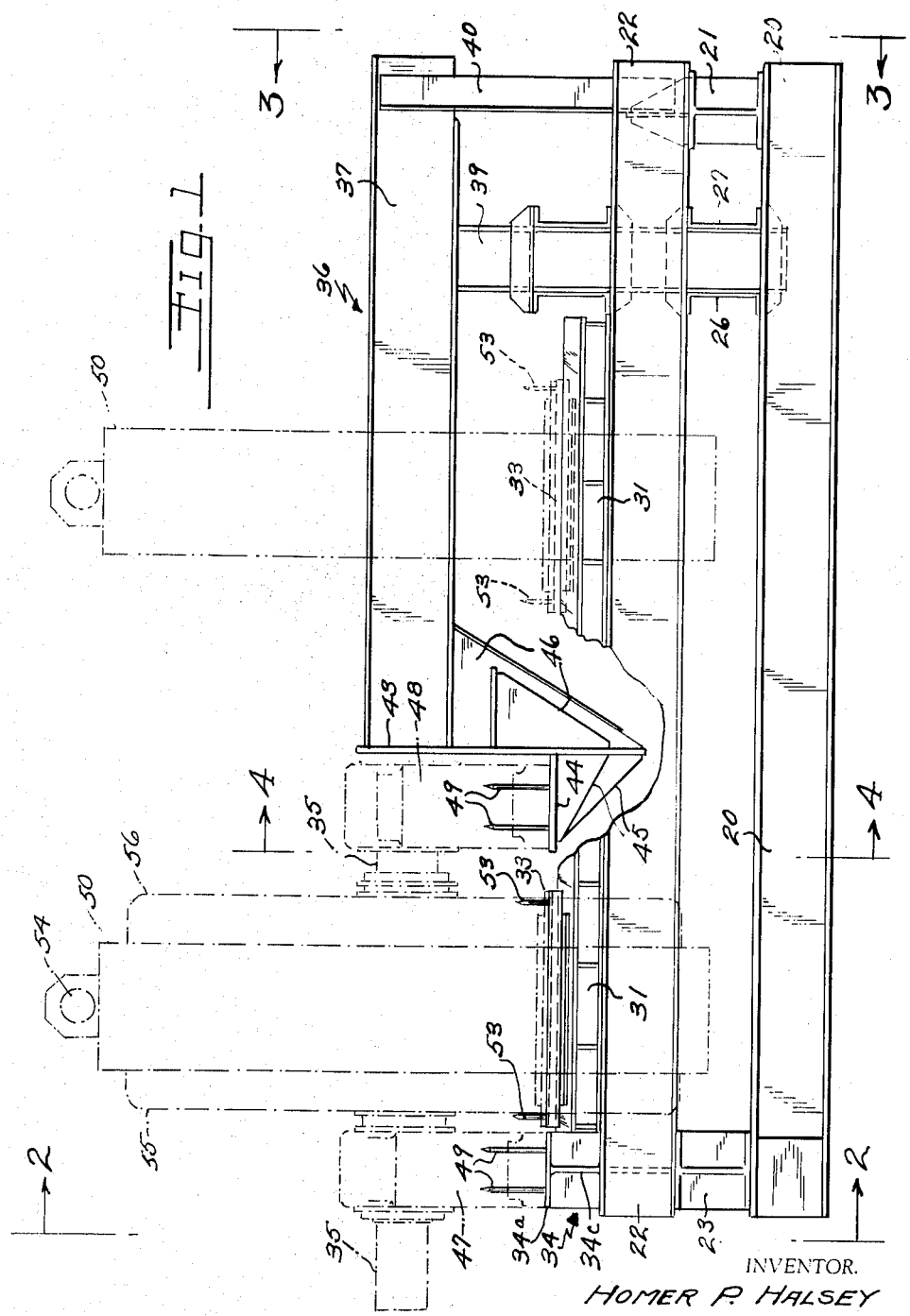
Figure 3:
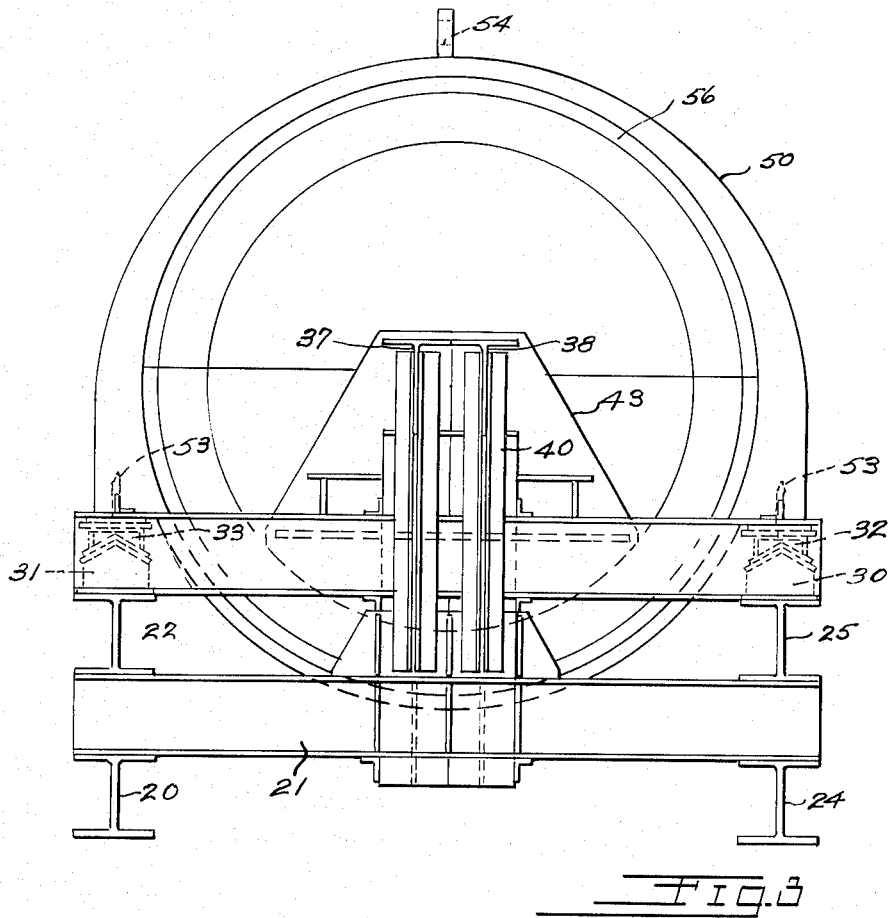
FIG. 3 is a view similar to FIG. 2, but as seen from the line 3—3 at the right end of FIG. 1.
Figure 4:
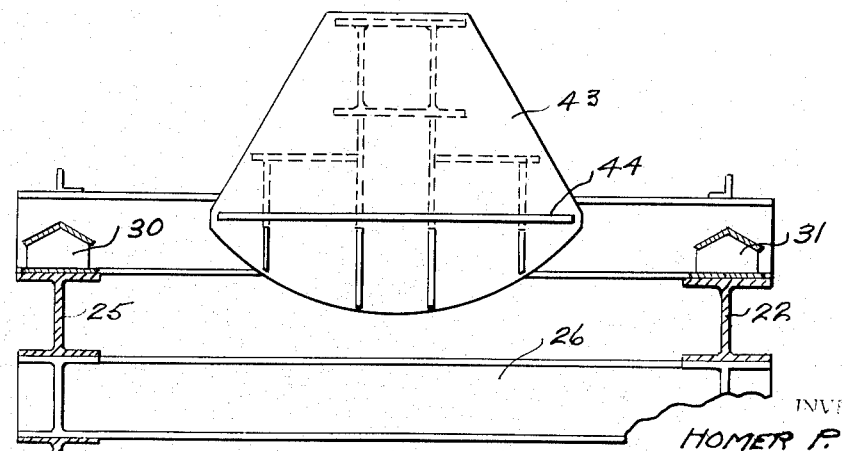
FIG. 4 is a vertical sectional view taken on the line 4—4 of FIG. 1.

Proceeding now to a description of the embodiment of the invention shown in the drawings, the maintenance rack includes a sturdy, fixed base which in the present instance is constructed from readily available structural beams cut to size and welded, riveted, or bolted in position. These members include horizontally superposed beams 20, 21, 22, 23, 24, 25, 26, 27, etc., built up into a rack or platform substantially enough to support the weight of a motor of the type to be repaired.

The two top parallel beams 22 and 25 run longitudinally along the rack and respectively support two tracks or runways 30 and 31 which have gabled top surfaces of reversed V-shape to accommodate complementary V-blocks 32 and 33. FIG. 6 shows a fragmentary portion of the track 30 supported on I-beam 25 and FIG. 5 shows block 32 which is adapted to ride as a carriage on track 30.

At the left or front end of FIG. 1 is a motor rack pedestal or platform 34, shown in elevation in FIG. 2. While it might take any convenient bench-like form, in the present instance it is a truncated pyramid in front view, having a top flat surface 34a braced with supports including side wings 34b and 34c (FIG. 2). The pedestal rests on beam 23, and, as indicated on FIG. 1, it supports one rotor bearing pedestal 47 which in turn supports one end of the motor shaft 35 when the motor is lowered into initial position by a crane hoist. Means is provided for supporting the other rotor bearing pedestal 48 which in turn supports the other end of the motor shaft, said means including a cantilever beam arrangement 36 including parallel horizontal I beams 37 and 38 which are supported on columns 39 and 40 fixed on the base. In the arrangement shown column 39 is under compression and column 40 is under tension. The actual details and specific structural members entering into the cantilever assembly and support form no part of the present invention and need not be described in detail. They are adequately shown in the drawings of one maintenance rack in present actual use.

At the free end of cantilever assembly 36 is a wall 43 to which is fixed a second platform or motor rack pedestal 44 braced underneath in the front by angle bracket plates 45, and in the rear by angle plates 46. The rotor bearing pedestals 47 and 48 are bored along their outer bottom edges and the motor can be lowered so that these bores fit downwardly around aligning pins 49 which are carried on the motor rack pedestals 34 and 44. In this initial position the stator 50 of the motor (FIG. 2) has two off-set downwardly-facing shoulders 50a and 50b which respectively rest on V-blocks 32 and 33, this position also being registered by means of aligning pins 53 on the blocks. The blocks of course are movable along the ways 30 and 31 to facilitate initial registering position of the motor assembly.

Maintenance or repair procedure takes place as follows. The motor and the motor pedestals are carried as a unit from their working location by means of a movable hoist or crane, a hook (not shown) being inserted in the hole 54 in the lug on top of stator 50. The motor is lowered to the position shown in FIG. 1 being guided during lowering to final position by the use of the aligning pins already described. The motor end guards 55 and 56 are then removed in manner well known in motor construction. In FIG. 2, I show a horizontal parting line 57 which permits complete removal of the guard halves 55 and 55a.

When the end guards are taken off, the stator 50 can be moved endwise along and around the cantilever beam by merely sliding the V-blocks on their greased runways, for example, to the right hand position shown in broken line in FIG. 1. The cantilever beam is disposed to pass through at approximately the central axis of the stator. The coils of the stator and rotor are thus exposed for convenient servicing. When the work is done, the stator is moved back to working registration with the rotor, the end guards are re-assembled, and the motor can be returned to its working station.

The present invention reaches its highest efficiency in the mater of saving of time, floor space, and working convenience when there are a number of motors of the same size and design in use in the same plant. As will be apparent to anyone skilled in the mechanical arts, the maintenance rack can be built from readily available structural parts by ordinary plant maintenance crews, and when its cost is pro-rated over a number of motors the unit cost per motor is considerably less than the cost of the same motor equipped with a "built-in" stator shift. Actually, if a plant has a substantial number of motors of identical structural characteristics, the "down" or inactive time at any position can be reduced to an inconsequential amount, if time saving is critical, by having one motor in excess of the number of motor stations, and making an immediate substitution of the extra motor while the other goes to the repair rack to become, in turn, the extra motor, when repaired.

If a plant has a number of motors of the presently-discussed type, but of varied sizes, several racks of respectively sized proportions may be provided, or a single rack may be designed with adjustable pedestals, runways, etc. The provision of such adjustments is well within the capabilities of those skilled in mechanical construction.

What is claimed is:

1. A motor maintenance rack comprising an elongated base, a first fixed platform crosswise on said base adapted to support one end of a motor rotor shaft, a second fixed platform crosswise on said base adapted to support the other end of the motor rotor shaft, a pair of longitudinally extending parallel runways fixed with respect to said base and disposed in a horizontal plane, said runways spaced respectively on opposite sides of said platforms, a pair of movable carriage members, one on each runway adapted to support respectively opposed sides of the stator housing of said motor, said runways and carriage members having complementary surfaces permitting longitudinal movement and preventing crosswise movement of said carriage members relative to said runways, whereby, when the motor is disposed with its rotor shaft parallel to said runways with opposite ends of said shaft supported respectively on said platforms and the stator sides resting on respective movable carriage members, said stator can be separated from said rotor and moved endwise along said runways for maintenance or repair of rotor and stator.

2. A motor maintenance rack as defined in claim 1 wherein the second said platform is carried on the free extending end of a cantilever beam supported from the end of the base remote from said first platform and wherein said second platform is adapted to pass axially through said stator as said stator is moved endwise away from said rotor as aforesaid.

3. A motor maintenance rack as defined in claim 1 wherein each said runway has a gabled upper face, and said carriage has a V-shaped lower surface which is complementary to said gabled surface.

4. A motor maintenance rack as defined in claim 1 wherein said platforms and said carriage members have aligning means, and said motor has corresponding registrable aligning means to facilitate initial positioning of the motor on the rack.

References Cited by the Examiner
UNITED STATES PATENTS

| | | | |
|---|---|---|---|
| 1,538,187 | 5/1925 | Herrick | 29—155.5 |
| 1,802,870 | 4/1931 | Brown | 310—273 X |
| 2,275,216 | 3/1942 | Broccoli | 29—200 |
| 2,763,802 | 9/1956 | Dolan | 29—155.5 X |

WHITMORE A. WILTZ, *Primary Examiner.*

THOMAS A. EAGER, *Examiner.*